Oct. 19, 1948.　　　　G. GUANELLA　　　　2,451,823
DIRECTION FINDING SYSTEM

Filed Dec. 10, 1947　　　　　　　　3 Sheets-Sheet 1

INVENTOR
GUSTAV GUANELLA
BY
ATTORNEY

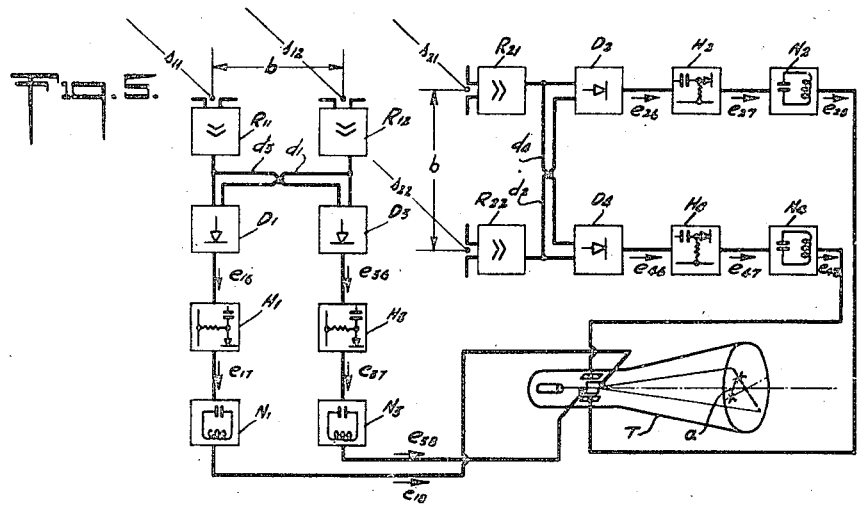
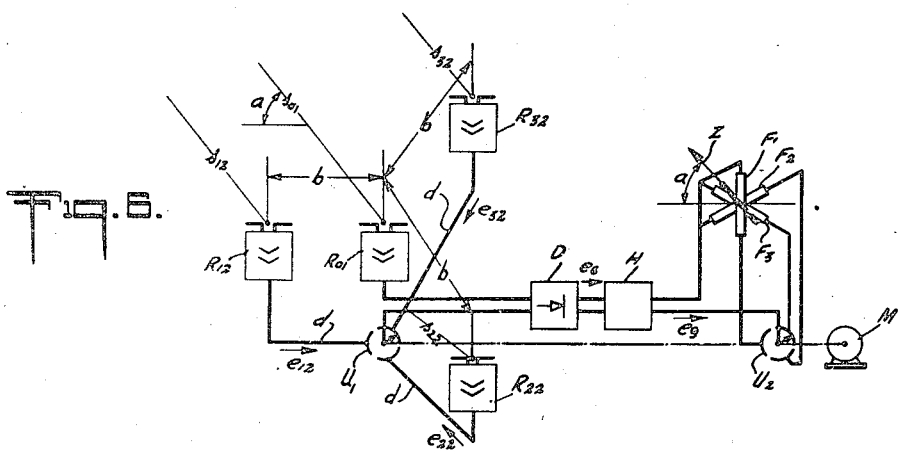
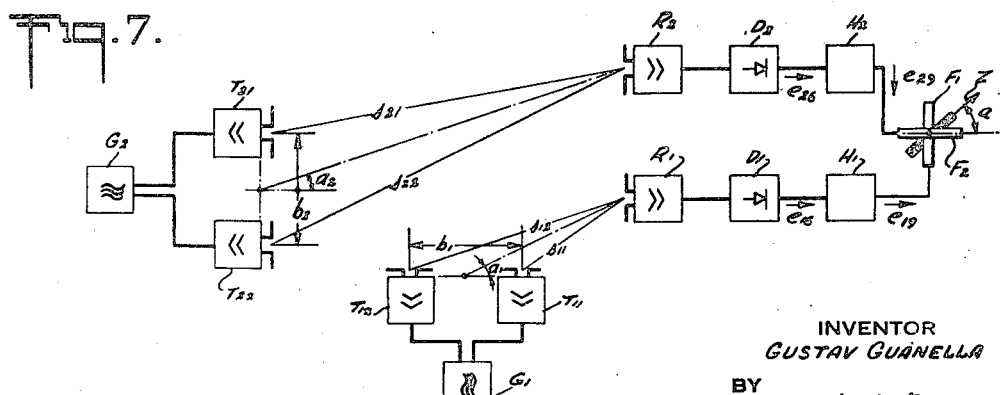

Oct. 19, 1948.                G. GUANELLA                 2,451,823
                        DIRECTION FINDING SYSTEM
Filed Dec. 10, 1947                                 3 Sheets-Sheet 3
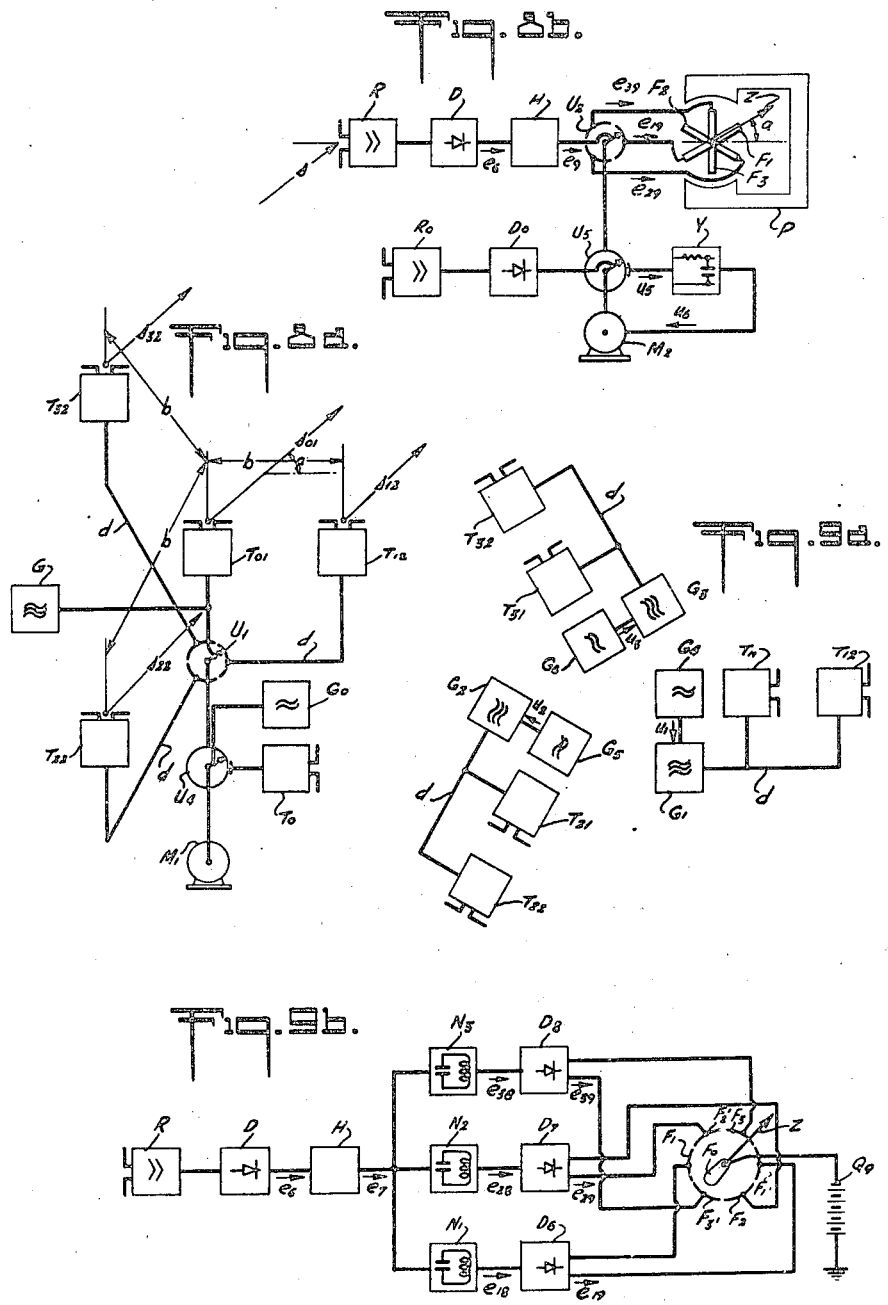
INVENTOR
GUSTAV GUANELLA
BY
ATTORNEY Patented Oct. 19, 1948

2,451,823

UNITED STATES PATENT OFFICE 2,451,823

DIRECTION FINDING SYSTEM

Gustav Guanella, Zurich, Switzerland, assignor to Radio Patents Corporation, New York, N. Y., a corporation of New York Application December 10, 1947, Serial No. 790,797
In Switzerland May 12, 1940

Section 1, Public Law 690, August 8, 1946
Patent expires May 12, 1960

19 Claims. (Cl. 343—104)

The present invention relates to a system for and a method of direction finding utilizing radiant energy such as radio waves, more particularly to arrangements for indicating the angle of transmission or reception within a full 360° angular range in a simple and unambiguous manner.

Various methods of direction finding have become known in the past according to which the incident direction of high frequency wave energy having a constant frequency is determined by means of fixed or adjustable directional antennae. It has also been proposed to determine the direction of incidence of a radio wave by using a frequency which increases and decreases periodically and by determining the beat frequency produced in the receiver by components of said wave radiated from at least two transmitting points spaced by a predetermined distance.

Although this method, described in greater detail in my U. S. Patent 2,413,620 issued December 31, 1946, entitled Direction finding system, overcomes some of the disadvantages of the previous direction finding systems, certain difficulties are still encountered in determining the direction based on a frequency measurement. In particular, the frequency measurement is dependent in general upon the amplitude of the received oscillations, whereby errors may occur in the direction indication, depending upon the prevailing transmission conditions.

The above difficulties are substantially overcome by the present invention based on a ratio indication of various beat frequencies for the determination of the direction. Accordingly, errors due to amplitude variations are substantially avoided, as the variations will cancel each other in the ratio. Furthermore, by the new method the desired direction may be read directly on a uniformly calibrated scale, substantially without requiring any special conversion and without any ambiguity of the indication.

The direction indication according to the invention is achieved by means of oscillations of periodically varying frequency radiated from a transmitter to a receiver over at least three different transmission paths whose relative lengths vary in accordance with the direction. Accordingly, there is produced in the receiver a first control value (current, voltage) having an amplitude proportional to the average beat frequency of the waves being transmitted over a first pair of said transmission paths and being applied to the first field system of a rotary field indicator, while at least one further control value having an amplitude proportional to the average beat frequency of oscillations transmitted over at least a second pair of said transmission paths is applied to a further field system of said indicator, in such a manner that the combined indication is dependent upon the ratio of said control values and the position of the indicating member or other agency of said indicator coincides with the direction of propagation to be determined.

The invention is equally suited for determining both the direction of transmission as well as the incoming direction of wave energy propagated from the transmitter to the receiver, as will be obvious from the following description.

The invention, both as to its further objects and novel aspects, will become more apparent from the following detailed description of various preferred practical embodiments taken in reference to the accompanying drawings forming part of this specification and wherein:

Figure 5 is a block diagram of a modified directional receiving system embodying the principles of the invention;

Figure 6 is a block diagram showing still another modification of a directional receiving system according to the invention;

Figure 7 is a block diagram of a direction finding system according to the invention embodying a directional transmitter and non-directional receiver, for indicating the direction of a received radio wave in accordance with the principle of the invention;

Figure 8a is a block diagram of a receiver and Figure 8b is a block diagram of a transmitter of a modified direction finding system of the type according to Figure 7; and Figure 9a is a diagram of a transmitting system and Figure 9b is a diagram for a cooperating receiver of still another modification of a direction system according to the invention of the type shown in Figure 7.

Like reference characters identify like parts throughout the different views of the drawings.

Figure 1:
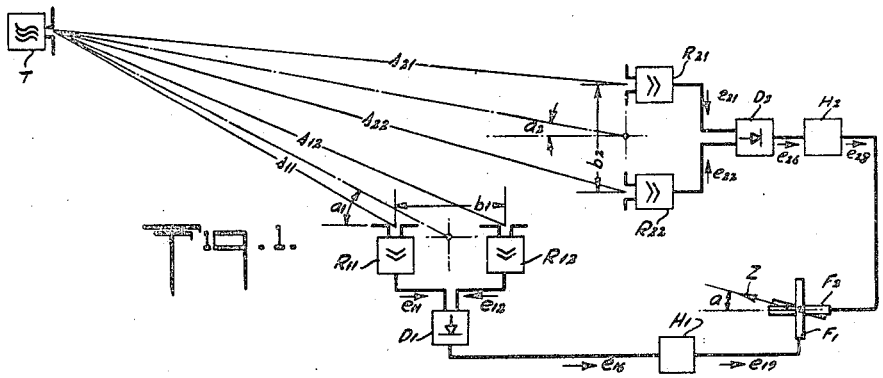
Figure 1 is a block diagram showing a basic form of direction finding system embodying a non-directional transmitter and a directional receiving system for indicating the angle of incidence of received radio waves in accordance with the principle of the invention.

Figure 1 shows a fundamental arrangement according to the invention for determining the angle of incidence of a radio wave in a receiving station which may be located on an aircraft or other moving vehicle. The waves are radiated by a transmitter T having a frequency $f$ which varies periodically according to a given modulating frequency. The waves are received by two pairs of spaced receivers $R_{11}$—$R_{12}$ and $R_{21}$—$R_{22}$ arranged in such a manner that their spacing or base lines $b_1$ and $b_2$ are perpendicular to each other, as shown in the drawing. The difference in length of the various transmission paths for each receiver pair are then as follows:

$$s_{12} - s_{11} = b_1 \cdot \cos a_1 \quad (1a)$$

$$s_{22} - s_{21} = b_2 \cdot \sin a_2 \quad (1b)$$

wherein $a_1$ and $a_2$ are the angles of incidence for the respective receiver pairs.

Accordingly, a corresponding difference exists between the transmission times $t_{11}$, $t_{12}$ and $t_{21}$, $t_{22}$ from the transmitter T to the various receivers, as follows:

$$t_1 = t_{12} - t_{11} = \frac{b_1}{c} \cos a_1 \quad (2a)$$

$$t_2 = t_{22} - t_{21} = \frac{b_2}{c} \sin a_2 \quad (2b)$$

wherein $c$ represents the velocity of propagation. Due to the variable transmitting frequency and the unequal transmission times, the frequencies $f_{11}, f_{12}, f_{21}, f_{22}$ of the oscillations received by the four receivers differ from each other, the differences being determined as follows:

$$f_1 = \left[ f_{11} - f_{12} \right] = \frac{df}{dt} \cdot (t_{12} - t_{11}) = g(t) \cdot t_1 \quad (3a)$$

$$f_2 = \left[ f_{21} - f_{22} \right] = \frac{df}{dt} \cdot (t_{22} - t_{21}) = g(t) \cdot t_2 \quad (3b)$$

provided, the rate of change or differential coefficient $$\frac{df}{dt} = g(t)$$

of the frequency $f(t)$ during the short time intervals $t_1$ and $t_2$, respectively, may be regarded as constant, as is always the case in practice. The brackets indicate that the positive absolute values of the difference are referred to, since only the absolute values of the frequency may be measured. By substituting (2a, 2b) in (3a, 3b) we obtain:

$$f_1 = \frac{b_1}{c} \cdot g(t) \cdot \cos a_1 \quad (4a)$$

$$f_2 = \frac{b_2}{c} \cdot g(t) \cdot \sin a_2 \quad (4b)$$

The oscillations $e_{11}, e_{12}$ and $e_{21}, e_{22}$ received by the receivers $R_{11}, R_{12}$ and $R_{21}, R_{22}$, respectively, are applied to the rectifiers $D_1$ and $D_2$, respectively, by means of which the low frequency voltages $e_{16}$ and $e_{26}$ are formed having frequencies equal with the respective difference frequencies, i. e. the beat frequencies $f_1$ and $f_2$ according to (4a) and (4b).

Thus, if the transmitting frequency $f$ is varied linearly between predetermined upper and lower limits, the receiving frequencies will also vary in a linear manner, their frequency differences $f_1$ and $f_2$ being constant except for relatively short transition periods. If the transmitting frequency changes $n$-times per second with a range of $F_0$ cycles between a minimum and a maximum value, then the frequency change per unit of time will be:

$$g(t) = \frac{df}{dt} = \pm 2.n.F_0 \text{ cycles} \quad (5)$$

i. e., the beat frequencies of the oscillations $e_{11}, e_{12}$ and $e_{21}, e_{22}$ received with a difference in transit time $t_1$ and $t_2$, respectively, will in this case be as follows in view of (4a) and (4b):

$$f_1 = \frac{2.b_1.n.F_0}{c} \cdot \cos a_1 = B_1 \cdot \cos a_1 \quad (6a)$$

$$f_2 = \frac{2.b_2.n.F_0}{c} \cdot \sin a_2 + B_2 \cdot \sin a_2 \quad (6b)$$

The constants $B_1$, $B_2$ depend only on the maximum frequency range $F_0$, the frequency $n$ of these changes per unit of time, the velocity of propagation $c$ and the known basis or spacing distances $b_1$ and $b_2$ of the receivers.

The frequency discriminators $H_1$ and $H_2$ serve to produce the control voltages $e_{19}$ and $e_{29}$ proportional to the average frequency of $e_{16}$ and $e_{26}$, respectively. In the case of a linear transmitting frequency variation in accordance with (6a, 6b) these control voltages are determined by the following expressions:

$$e_{19} = k_1.f_1 = k_1.B_1 \cos a_1 = K_1 \cdot \cos a_1 \quad (7a)$$

$$e_{29} = k_2.f_2 = k_2.B_2 \sin a_2 = K_2 \cdot \sin a_2 \quad (7b)$$

the constants $k_1, k_2$ depending merely upon the adjustment of the frequency control or discriminator circuits $H_1, H_2$. This adjustment may be so made that even for unequal bases $b_1$ and $b_2$, the following condition will be fulfilled:

$$K_1 = K_2 = K \quad (8)$$

The distances $s$ from the transmitter to the receivers are generally so large compared with the bases or distances $b_1$ and $b_2$ between the receivers, that the following approximation may be made:

$$a_1 = a_2 = a \quad (9)$$

The voltages $e_{19}$ and $e_{29}$ are applied each to a field winding or system $F_1$ and $F_2$ of a rotary field indicator, whereby two field vectors $E_1$ and $E_2$, perpendicular to each other, will be set up in the indicator, which on account of (7a, 7b), (8) and (9) are determined by the following equations:

$$E_1 = E_0 \cdot \cos a \quad (10a)$$

$$E_2 = E_0 \cdot \sin a \quad (10b)$$

These field components produce a resultant field vector E, which is displaced by an angle $a$ relative to the zero direction. Accordingly, a pointer Z arranged to be rotated by the resultant field, will place itself in a position corresponding to the direction of the field and indicate directly the desired angle $a$ of incidence of the received wave energy.

Since the frequency range $F_0$ and the frequency of variation $n$ are both contained in the constants $B_1$ and $B_2$ and thus also in the constants $K_1$ and $K_2$, a change of the values $F_0$ or $n$ will result in a corresponding change of $E_0$ in (10a) and at the same time in (10b) by a certain factor, so that the ratio $E_1/E_2$ and therefore the direction of the resultant vector E remains unchanged. Hence, the direction indication is in no way influenced by changes in the frequency variation at the transmitter, such changes being difficult to avoid under normal operating conditions. Similarly, any amplitude changes of the received waves due to fluctuations in the transmission will have no influence on the indication, since such fluctuations will effect both control values in the same manner and accordingly cancel each other in their effect on the ratio indication.

Instead of a linear change of the transmitting frequency $f$, any other form of periodic variation may be used. Thus, it is possible to vary the frequency in respect to a center or mean value $f_0$ in accordance with a sinusoidal law according to the following equation:

$$f = f_0 F_0 \sin(vt) \qquad (11)$$

In this case, the rate of change of the frequency or differential coefficient is as follows:

$$g(t) = \frac{df}{dt} = F_0 \cdot v \cdot \cos(vt) \qquad (12)$$

and the beat frequencies in both pairs of receivers according to (4a, 4b) will be as follows:

$$f_1 = \frac{b_1 \cdot F_0 \cdot v}{c} = \cos(vt) \cdot \cos a \qquad (13a)$$

$$f_2 = \frac{b_2 \cdot F_0 \cdot v}{c} = \cos(vt) \cdot \sin a \qquad (13b)$$

i. e., the frequencies of the voltages $e_{18}$ and $e_{28}$ vary between zero and limit values which are proportional to the cosine and sine, respectively, of the angle of incidence $a$. Since these variations occur periodically at the rate of the constant frequency $v$ in radians per second, the control voltages proportional to the beat frequency may be freed of any disturbing frequency components by selective means or filters before determining their average amplitudes. The latter are again proportional to $\cos(a)$ and $\sin(a)$, respectively, i. e., the desired angle of incidence may again be indicated directly by means of a rotary field indicator.

Figure 2:
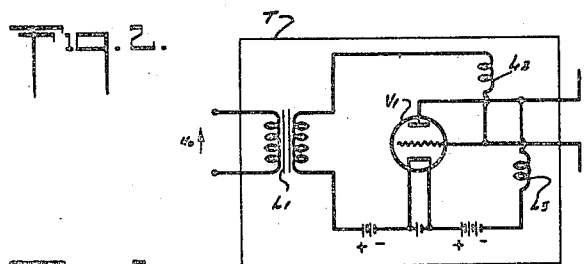
Figure 2 is a circuit diagram showing, by way of example, a transmitting oscillator suitable for use in connection with Figure 1.

The transmitter T for producing and radiating the frequency modulated oscillations may comprise an electron tube $V_1$ operated in retarding field or positive grid oscillator connection, as shown in Figure 2. As is well known, the frequency of such a positive grid oscillator is dependent upon the operating voltages applied to the plate and grid by way of the high frequency choke coils $L_2$ and $L_3$. In the example shown, the frequency is varied according to a low frequency control voltage $u_0$ superimposed upon the grid voltage by way of a low frequency transformer $L_1$. This control voltage may be produced by a suitable saw tooth oscillation generator, so as to obtain corresponding linear changes of the transmitting frequency $f$. Any changes of the generator frequency or irregularities in the control of the transmitting frequency will have no influence upon the exact determination of the direction, for reasons already mentioned. On the other hand, a sinusoidal frequency change of the oscillations radiated by the antennae in Figure 2 may be obtained by using a suitable alternating control voltage $u_0$ free from harmonics for energizing the transformer $L_1$.

Various other types of generators are known which are suitable for generating oscillations of a variable frequency. Thus, the frequency modulation may be effected by means of reactance control tube acting as a variable capacitance controlled by a saw tooth voltage and effectively shunted across a tuning circuit of a standard regenerative feedback oscillator, in a manner well known. Other arrangements are known, wherein a variable transmitting frequency is produced by means of a generator having mechanically variable tuning means with or without subsequent frequency multiplication.

Figure 3:
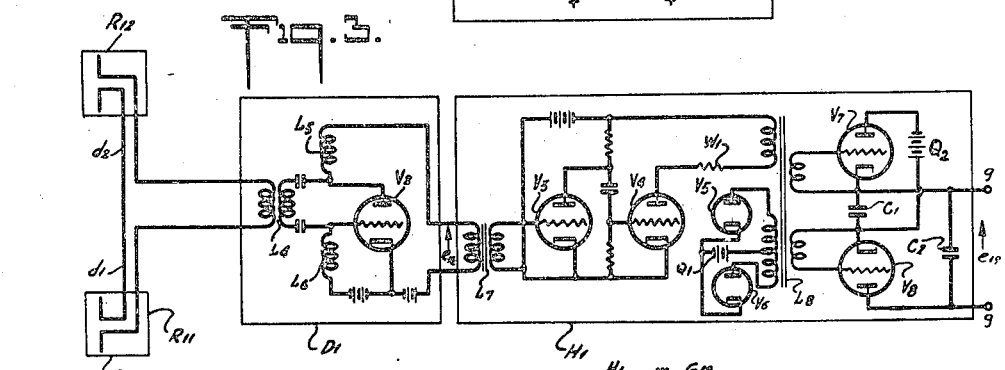
Figure 3 shows in greater detail a circuit diagram of one of the pairs of a directional receiver as shown in Figure 1.

Figure 3 shows, by way of example, a circuit diagram for the receiver pair $R_{11}$—$R_{12}$. The high frequency oscillations received by two dipole antennae are applied to the detector circuit $D_1$ by way of a pair of transmission lines $d_1$ and $d_2$ of equal length. The detector $D_1$ may comprise a tube $V_2$ operated as retarding field and ion detector as shown, whereby the average anode potential of the tube varies according to the instantaneous input amplitude. Since the latter varies at the rate of the beat frequency $f_1$ between both received oscillations, the frequency of the low frequency voltage $e_{18}$ obtained from the output transformer $L_7$ will be equal to the beat frequency. The frequency sensitive circuit $H_1$, in the example shown, contains a low frequency amplifier comprising two amplifier stages $V_3$ and $V_4$. By means of an amplitude filter or limiter in conjunction with the diode rectifiers $V_5$ and $V_6$, the alternating currents transmitted by the transformer $L_8$ are prevented from exceeding predetermined maximum and minimum values, by reason of the fact that a discharge current always starts to flow through one of the diode discharge paths, as soon as the transmission voltage reaches a value equal to the voltage of the biasing battery $Q_1$. This discharge current, due to the voltage drop in the tube $V_4$ or a special series resistance $W_1$ acts to prevent a further rise in voltage. By this means, a rectangular voltage of the same frequency is obtained from a sinusoidal input voltage and applied to the tubes $V_7$ and $V_8$ by way of separate secondary coils of the transformer $L_8$.

If the grid of tube $V_7$ is positive, current may pass through the tube and condenser $C_1$ will be charged by the voltage of battery $Q_2$. During the next half cycle of the input voltage, the grid of tube $V_8$ becomes positive, whereby this tube allows current to pass so that the charge of the condenser is passed to the output terminals 9. At the same time, the grid of tube $V_7$ becomes negative so that it is impossible for current to continue to flow from the battery $Q_2$. This process will repeat itself with each fresh change of the input voltage, whereby to obtain an average current or voltage across the terminals 9 which is proportional to the frequency of the input voltage. Condenser $C_2$ serves to eliminate any irregularities in the output current thus obtained. A field system $F_1$ of the rotary field instrument is directly connected to the terminals 9 in the manner shown in Figure 1.

In a similar manner, a second circuit as shown in Figure 3 is provided for the receiver pair $R_{21}$—$R_{22}$ including a detector $D_2$ and frequency sensitive circuit $H_2$ and whose output current is applied to the second field system $F_2$ of the indicator.

In place of the counter-type frequency discriminator, any other known frequency detector may be employed for the purpose of the invention, as is readily understood.

The receiving circuits may be modified in accordance with existing practice. Thus, the receivers $R_{11}$ and $R_{12}$ may include high frequency amplifiers by means of which the received oscillations are amplified before rectification. Furthermore, it is possible, by means of an automatic volume or amplification control embodied in the high or low frequency sections, to maintain a constant amplitude of the low frequency output currents, substantially independently of the receiving field strength.

A frequency responsive control voltage $e_{19}$ may also be obtained by passing the low frequency voltage $e_{16}$ through a slope filter having a frequency-dependent amplitude characteristic and by subsequent rectification of the filter output current. If the beat frequency varies periodically, as in the case of sinusoidal variation of the transmitting frequency, the frequency responsive output voltage or current may be passed through a band-pass filter having a corresponding range for eliminating interfering and other disturbing frequency components. After subsequent further rectification, there is then obtained a control voltage proportional to and corresponding to the average beat frequency. The control values obtained in this manner may then be utilized to determine the direction by means of a rotary field indicator, in the manner described hereinabove. If a cathode ray tube is used for the direction indication, further rectification of the voltage derived from the output of the band-pass filter is not necessary, as will become further apparent hereafter.

Super-regenerative receivers may also be used for the purpose of the invention. As is well known, the low frequency output current or voltage of such receivers varies in proportion to the instantaneous value of the high frequency input amplitude. Since the latter varies at the rate of the beat frequency $f_1$ and $f_2$, respectively, low frequency voltages $e_{16}$ and $e_{26}$ having frequencies $f_1$ and $f_2$ are thus obtained without any additional rectifiers. Accordingly, the directional angle $a$ may be determined in the manner described by producing frequency responsive voltages or currents and by comparing the latter in a rotary field indicator or the like.

The received oscillations may also be applied to a superheterodyne receiver before rectification in $D_1$ and $D_2$, whereby at first intermediate frequency oscillations will be produced whose amplitude varies at the rate of the respective beat frequencies and subsequent rectification will result in the low frequency voltages $e_{16}$ and $e_{26}$ having frequencies equal to $f_1$ and $f_2$, respectively.

If the receivers $R_{11}$—$R_{12}$ and $R_{21}$—$R_{22}$ are superheterodyne receivers, a common auxiliary oscillator may be provided for each or both receiver pairs. Since in this case, the intermediate frequencies differ by the same amounts from the original receiving frequencies, the beat frequencies between the respective intermediate frequencies will be the same as the beat frequencies between the high frequency input oscillations, whereby the low frequency oscillations obtained by rectifying the intermediate frequency oscillations in the detectors $D_1$ and $D_2$ will again be equal to voltages $e_{16}$ and $e_{26}$, respectively.

The field systems $F_1$ and $F_2$ of the rotary field indicator may be in the form of fixed cross-coils with a pre-magnetized member arranged to rotate freely within said coils so as to adjust itself in the direction of the resultant field of the coils. It is also possible to use an instrument comprising two crossed coils excited by the control voltages and arranged to rotate freely in a constant field produced by a permanent magnet or the like, whereby said coils will adjust themselves to a position, where the resultant field coincides with the direction of said constant field. A pointer Z affixed to said coils thus again indicates directly the desired angle of incidence $a$. Evidently, other types of rotary field indicators or ratio meters may be used for the purpose of the invention, the indication of which depends upon the ratio of the impressed control voltages or currents. Thus, electrostatic rotary field instruments are equally suitable for effecting the direction indication, as shown in Figure 9b and described hereafter.

The rotary field indicator having a mechanically operated indicating member may be replaced by a cathode ray tube as a means for indicating the angle of incidence. In this case, the control voltages are applied to the deflection systems of the tube, so as to produce a resultant deflecting field at an angle corresponding to the angle of incidence to be determined. The latter may thus be ascertained directly from the position of the luminous spot upon the screen of the cathode ray tube by means of a suitably calibrated scale associated with said screen.

If the beat frequencies vary periodically, as is the case according to equations (13a, 13b) of a sinusoidally varying transmitting frequency, the control voltages proportional to the beat frequencies also vary in amplitude, the amplitude variations being proportional to the cosine and sine, respectively, of the directional angle, as pointed out hereinabove. These control voltages may then after further rectification, be applied to the deflection systems of the cathode ray tube on the screen of which a luminous line or image will be produced. The inclination of this line is a function of the amplitude ratio of the applied control voltages and accordingly of the directional angle $a$ to be determined. An arrangement of this type is shown in Figure 5 and described in greater detail hereafter.

A disadvantage of the arrangement shown in Figure 1 is the fact that the control voltages $e_{16}$ and $e_{26}$ and accordingly the field vectors $E_1$ and $E_2$ are dependent only upon the absolute values of cos $(a)$ and sin $(a)$. In other words, a positive path difference $s_1 = s_{12} - s_{11}$ and an equally large negative path difference will produce the same indications, so that a given pointer deflection may correspond both to various angles of incidence, viz. angles $a$, $(180° - a)$, $(180° + a)$ and $(360° - a)$.

Figure 4:
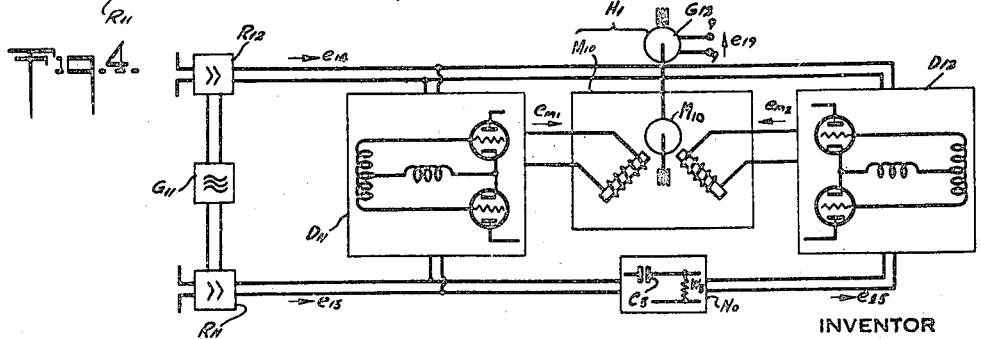
Figure 4 is a diagram showing a modification of a receiver for use in connection with Figure 1.

A receiving arrangement by which this ambiguity is avoided, is shown in Figure 4. Disregarding temporarily the auxiliary generator $G_{11}$, let it be assumed that the receivers $R_{11}$ and $R_{12}$ are straight high frequency (RF) amplifiers, so that the frequency of the amplified oscillations $e_{13}$ and $e_{14}$ coincides with the frequency of the received oscillations $e_{11}$ and $e_{12}$ and that the frequency $w = 2\pi f$ of the oscillations radiated by the transmitter increases linearly according to a saw-tooth variation and suddenly decreases after reaching a predetermined maximum. In this case the frequency variation may be expressed as follows:

$$W = h.(t - nt_s) \quad (14)$$

wherein $h$ is a constant, $t$ the constant time interval between two sudden frequency changes, and $n$ represent progressively increasing whole numbers. The frequencies of the received oscillations, in view of the transmission times $t_{11}$ and $t_{12}$ respectively, will then be as follows:

$$W_{31} = h.(t - n.t_s - t_{11}) \quad (15a)$$
$$W_{12} = h.(t - n.t_s - t_{12}) \quad (15b)$$

The received oscillations themselves are then obtained as follows:

$$e_{13} = C_{13}. \sin (\int W_{11}.dt) = C_{13}. \sin (\tfrac{1}{2}ht^2 - hnt_s.t - ht_{11}.t - k_{13}) \quad (16a)$$

$$e_{14} = C_{14}. \sin (\int W_{12}.dt) = C_{14}. \sin (\tfrac{1}{2}ht^2 - hnt_s.t - ht_{12}.t - k_{14}) \quad (16b)$$

wherein $C_{13}$, $C_{14}$ are constant amplitudes and $k_{13}$ and $k_{14}$ represent integration constants.

The oscillation $e_{13}$ is passed through a phase-shifting network $N_0$ which may consist of a series capacitance $C_3$ and a parallel resistance $W_3$, as shown in the drawing. This network is designed to produce a phase shift of 90°, so as to obtain an output voltage $e_{15}$ from the network $N_0$ as follows:

$$e_{15}=C_{15} \cos (\int W_{11}.dt) =C_{15}. \cos (\tfrac{1}{2}ht^2-hnt_s.t-ht_{11}.t-k_{13}) \quad (17)$$

In the modulation arrangement $D_{11}$ and $D_{12}$ which may comprise a pair of rectifier tubes in push-pull connection, there are formed the following modulation products by intermodulation of voltages $e_{13}$ and $e_{14}$ and voltages $e_{14}$ and $e_{15}$, respectively:

$$e_{m1}=C_{m1} \cdot e_{13} \cdot e_{14} \quad (18a)$$
$$e_{m2}=C_{m2} \cdot e_{14} \cdot e_{15} \quad (18b)$$

wherein $C_{m1}$ and $C_{m2}$ are constants. These modulation products may be derived in a known manner from the sum and difference frequencies of the respective modulation input voltages. The higher sum frequencies are suppressed, so that only the lower difference frequencies remain, as expressed by the following equations:

$$e_{m1}=k_{m1} \cdot \cos (ht_{12} \cdot t-ht_{11} \cdot t+k_{14}-k_{13}) =k_{m1} \cdot \cos (ht_1 \cdot t+k_1) \quad (19a)$$
$$e_{m2}=k_{m2} \cdot \sin (ht_{12} \cdot t-ht_{11} \cdot t+k_{14}-k_{13}) =k_{m2} \cdot \sin (ht_1 \cdot t+k_1) \quad (19b)$$

wherein $k_{m1}$, $k_{m2}$, $k_1$ are again constants.

These modulation output voltages $e_{m1}$ and $e_{m2}$ are applied to the field windings of a synchronous or asynchronous motor $M_{10}$. As a result, there will be produced a rotary field in this motor which according to the sign of $t_1$ rotates in a forward or backward direction at a speed proportional to $t_1$. Consequently, the rotor of the motor $M_{10}$ also rotates and with it the armature of the direct current generator $G_{12}$ directly coupled with $M_{10}$, at the same speed or a somewhat lower speed reduced due to slip. The terminal voltage $e_{19}$ of generator $G_{12}$ is accordingly proportional to the speed of rotation, that is in view of (2a) and (2b):

$$e_{19}=k_{19}.t_1=K_1. \cos (a) \quad (20)$$

wherein $k_{19}$ and $K$ are constants. The sign of $e_{19}$, in contrast to (7a) corresponds to the sign of $\cos (a)$.

By the provision of a further arrangement analogous to that shown in Figure 4 and connected to receivers $R_{21}$—$R_{22}$ having a base line $b_2$ perpendicular to the base line $b_1$ of $R_{11}$—$R_{12}$, a further control voltage $e_{29}$ is obtained in an analogous manner as follows:

$$e_{29}=k_{29}.t_2=K_2. \sin (a) \quad (21)$$

These control voltages are applied to the crossed field coils of the rotary field indicator, so as to obtain the following orthogonal field vectors:

$$E_1=E_0. \cos (a) \quad (22a)$$
$$E_2=E_0. \sin (a) \quad (22b)$$

The sign of these vectors, in contrast to (10a) and (10b), is equal to the sign of $\cos (a)$ and $\sin (a)$, respectively. Accordingly, the directional angle of the resulting field vector $E$ coincides with the desired direction $a$ which may thus be read off directly by means of a pointer secured to the rotary member of the indicator.

Superheterodyne receivers may be substituted for the receivers $R_{11}$—$R_{12}$ and $R_{21}$—$R_{22}$, respectively, as is readily understood. In this case, the received oscillations $e_{11}$ and $e_{12}$ of the receiver pair $R_{11}$—$R_{12}$ are superimposed upon the oscillation of the auxiliary generator $G_{11}$ which is common for both receivers. Accordingly, two intermediate frequency oscillations $e_{13}$ and $e_{14}$ are produced whose frequencies $W_{13}$ and $W_{14}$ differ by the same amount from $W_{11}$ and $W_{12}$, respectively. It is obvious that in this case too the relations (19a) and (19b) apply to the modulation products $e_{m1}$ and $e_{m2}$ and to all further derived values, so that again the directional angle $a$ may be ascertained by means of a rotary field instrument.

A special advantage of arrangements using rotating machines ($M_{10}$, $G_{12}$, in Figure 4) is due to the fact that such machines, due to their mechanical inertia are unable to follow the rapidly changing disturbing frequencies of the applied voltages $e_{13}$, $e_{14}$, $e_{m1}$ and $e_{m2}$ so that the effects of irregular disturbances and interference are substantially eliminated.

The ambiguity of the indication inherent in the basic arrangement of Figure 3 may also be eliminated by an arrangement according to Figure 5 using unequal transmission times between the receivers and rectifiers or detectors. Due to the additional transmission time $t_0$ through the connecting line $d_1$ from the receiver $R_{12}$ to the detector $D_1$ and through the connecting line $d_3$ from receiver $R_{11}$ to detector $D_3$, the following equations apply to the frequency differences of the oscillations applied to the four detectors $D_1$, $D_2$, $D_3$, $D_4$ of a complete receiving system as shown in Figure 5:

$$f_1=g(t).\left(t_0+\frac{b}{c} \cos a \right) \quad (23a)$$
$$f_2=g(t).\left(t_0+\frac{b}{c} \sin a \right) \quad (23b)$$
$$f_3=g(t).\left(t_0-\frac{b}{c} \cos a \right) \quad (23c)$$
$$f_4=g(t).\left(t_0-\frac{b}{c} \sin a \right) \quad (23d)$$

wherein it has been assumed that $t_0$ is greater than $b/c$, so that the bracketed expressions $$\left(t_0+\frac{b}{c} \cos a \right)$$

etc., are always positive.

The control voltages $e_{19}=k.f_1$, $e_{29}=k.f_2$, $e_{39}=k.f_3$ and $e_{49}=k.f_4$ corresponding to the average values of the beat frequencies $f_1$, $f_2$, $f_3$, $f_4$ are again obtained from the frequency sensitive circuits or discriminators $H_1$, $H_2$, $H_3$, $H_4$, such as in the form of slope filters and subsequent rectifiers. These control voltages, after suitable filtering if necessary, are then applied to the crossed field systems of a rotary field indicator, so as to result in a first field vector $E_1$ proportional to $(e_{19}-e_{39})$ and a second field vector $E_2$ perpendicular thereto and proportional to $(e_{29}-e_{49})$. The field vectors themselves will then be as follows:

$$E_1=E_0. \cos (a) \quad (24a)$$
$$E_2=E_0. \sin (a) \quad (24b)$$

that is, contrary to (10a) and (10b), their sign changes according to the sign of $\cos (a)$ and $\sin (a)$, since in the expressions (23a)—(23d) it is no longer necessary to use the positive absolute values of these sines and cosines. In this manner, a resultant field vector $E$ is obtained the position of which corresponds the angle of incidence $a$, whereby this angle may be ascertained by means of a rotary field indicator within a full 360° scale of indication.

If the transmitting frequency varies sinusoidally according to (11), the beat frequencies also vary periodically according to (13a) and (13b). Accordingly, the values $e_{17}$, $e_{27}$, $e_{37}$ and $e_{47}$ obtained in this case from the frequency detectors $H_1$, $H_2$, $H_3$ and $H_4$ also vary at the same rate. These can be freed from undesirable disturbing components by means of the band filters $N_1$, $N_2$, $N_3$ and $N_4$, respectively, so that control voltages $e_{18}$, $e_{28}$, $e_{38}$ and $e_{48}$ are obtained having a constant frequency and varying amplitudes proportional to the respective beat frequencies. The constant control voltages $e_{19}$, $e_{29}$, $e_{39}$ and $e_{49}$ required for the direction indication by means of a cross-coil instrument may then be derived by simple linear rectification.

The control voltages $e_{18}$, $e_{28}$, $e_{38}$ and $e_{48}$ varying at a constant frequency may, however, also be applied directly, i. e. without rectification, to a suitable indicating instrument, such as a cathode ray tube as shown in Figure 5. Since these alternating voltages vary with the same frequency and phase, a linear image will appear upon the fluorescent screen of the tube. The angle of inclination of this image depends upon the amplitude ratio of the voltages applied to the deflection systems of the tube, i. e. upon the ratio of the frequency differences $(f_1-f_3)$ and $(f_2-f_4)$, respectively. Since these differences behave according to (23a-d) like cos $(a)$ to sin $(a)$ the inclination of the luminous line coincides exactly with the angle of incidence $a$ to be determined.

Instead of using two pairs of receivers with their base lines perpendicular to each other, any other number of pairs of receivers may be provided the base lines of which are mutually displaced by equal angular distances. Thus, the arrangement shown in Figure 6 comprises three pairs of receivers whose base lines are displaced by angles of 120°. For reasons of economy, the three pairs of receivers $R_{01}$—$R_{12}$, $R_{01}$—$R_{22}$, $R_{01}$—$R_{32}$ comprise a common receiver $R_{01}$, so that only four receivers in all are required. In order to obtain a clear indication, the receiving currents of the three outer receivers $R_{12}$, $R_{22}$, $R_{32}$ are transmitted through equally long transmission lines $d$, whereby an additional delay occurs amounting to $t_0$. The following equations then apply to the frequency differences of the oscillations obtained from the three pairs of receivers:

$$f_1 = g(t) \cdot \left[ t_0 - \frac{b}{c} \cos (a) \right] \quad (25a)$$

$$f_2 = g(t) \cdot \left[ t_0 - \frac{b}{c} \cos (120° + a) \right] \quad (25b)$$

$$f_3 = g(t) \cdot \left[ t_0 - \frac{b}{c} \cos (240° + a) \right] \quad (25c)$$

wherein $t_0$ is greater than $b/c$, while the brackets indicate that the absolute values of $g(t)$ are to be considered.

The three control voltages $e_{19}=k.f_1$, $e_{29}=k.f_2$ and $e_{39}=k.f_3$ may be derived from these beat frequencies by rectification and frequency detection and the control voltages obtained applied to the three field systems of a rotary field indicator which are also mutually displaced by 120° as shown in the drawing and resulting in the following field components:

$$E_1 = E_0 \cdot \cos (a) \quad (26a)$$
$$E_2 = E_0 \cdot \cos (120° + a) \quad (26b)$$
$$E_3 = E_0 \cdot \cos (240° + a) \quad (26c)$$

which are mutually spaced by angles of 120°.

The horizontal component of the resultant vector is then:

$$E_h = E_1 - E_2 \cos (120°) + E_3 \cos (240°) = \frac{3}{2} E_0 \cos (a) \quad (27a)$$

while the vertical component of this vector is:

$$E_v = E_2 \sin (240°) + E_3 \sin (120°) = \frac{3}{2} E_0 \sin (a) \quad (27b)$$

i. e. the resultant vector is again displaced by the angle $a$ from the zero line. Accordingly, the pointer Z placing itself in the direction of this resultant field again directly indicates the angle of incidence $a$.

In order to save rectifier and frequency detector circuits, a pair of change-over switches $U_1$ and $U_2$ driven by a motor M are provided in Figure 6. The first change-over switch $U_1$ serves to apply the energies received by the three pairs of receivers to the detector D successively and alternately during substantially equal intervals of time. The frequency-dependent control voltage $e_9$ derived from $e_8$ in the frequency detector circuit H is in turn applied by way of the change-over switch $U_2$ to the corresponding field system $F_1$, $F_2$, or $F_3$, respectively, of the rotary field indicator. Each of these field systems is therefore without current for ⅔ of a total operating period and is only energized during ⅓ of the time. The average values of the three field components $E_1$, $E_2$, $E_3$ are thus reduced to a third of the original value. Even then, the pointer Z adjusts itself in the direction of the desired angle of incidence, since due to its inertia it cannot follow the rapid periodic field fluctuations. Instead of having three receiver pairs, it is also possible to provide similar arrangements with four or more pairs of receivers and a correspondingly constructed indicator, as is readily understood.

A special advantage of arrangements using switching devices is the fact that the transmission characteristics of the rectifier D and the frequency detector circuit H will have no effect on the direction indication. Each change in these properties has an equal effect on all the control voltages applied to the field systems $F_1$, $F_2$, $F_3$, thus involving merely a change in the constants $E_0$ in (26a), (26b) and (26c).

In Figures 7 to 9 there are shown arrangements according to the invention for determining the direction of transmission or radiation of electromagnetic waves. For this purpose, several transmitters are positioned in such a manner that the differences in the length of the paths from various transmitter pairs to the receiver, and accordingly the respective beat frequencies obtained in the receiver, vary with the directional position of the receiver. Thus, in Figure 7. there are shown two pairs of transmitters $T_{11}$—$T_{12}$ and $T_{21}$—$T_{22}$, respectively, excited in such a manner by a pair of control or master generators $G_1$ and $G_2$, respectively, that the frequency of the radiated oscillations varies periodically with respect to an average value according to a predetermined function. The equations (1a) and (1b) apply then to the differences between the various transmission paths to the receivers $R_1$, $R_2$ and accordingly the relations (2a) and (2b) apply to the differences of the transmission times from the first transmitter pair to a first receiver $R_1$ and from the second transmitter pair to the second receiver $R_2$, respectively. Beat frequencies according to equations (3a) and (3b), (4a) and (4b) are accordingly produced in the receivers, resulting in two low frequency output voltages $e_{16}$ and $e_{26}$ obtained by rectification in $D_1$ and $D_2$, the frequencies of these voltages corresponding to the respective beat frequencies.

If the transmitting frequencies vary linearly with respect to a definite average frequency, the expressions (6a) and (6b) again apply for the beat frequencies. In this case, the frequency-proportional voltages $e_{19}$ and $e_{29}$ are formed in frequency detector circuits $H_1$ and $H_2$, these voltages in the case of linear frequency variation according to (7a) and (7b) being again proportional to the sine and cosine, respectively, of the directional angle $a$. In this case, the latter represents the transmitting angle, that is the angle at which the waves are radiated from the transmitters to the receivers. The output voltages $e_{19}$ and $e_{29}$ are again applied to the field systems $F_1$, $F_2$ of a rotary field indicator which serves to indicate directly the desired angular position of the transmitter in a manner readily understood from the foregoing.

The transmitters $T_{11}$—$T_{12}$ and $T_{21}$—$T_{22}$ may be in the form of amplifiers controlled by common generators $G_1$ and $G_2$, respectively. The frequency of the latter may again be varied by controlling the tuning adjustment by means of a correspondingly variable control voltage or by mechanical means. Special frequency multiplying circuits may precede the amplifiers if necessary in order to increase the transmitting frequency. The individual transmitters may also include separate generators whose frequency is varied simultaneously by a common control generator.

Superheterodyne amplifiers may again be used in the receivers $R_1$, $R_2$, inasmuch as the amplitude of the intermediate frequency oscillations rectified in $D_1$ and $D_2$ varies at the rate of the amplitudes of the received high frequency oscillations, so that the same low frequency voltages $e_{16}$ and $e_{26}$ will be obtained after rectification.

In order that the system operates properly, it is necessary that the receiver $R_1$ should not receive any oscillations from the transmitter pair $T_{12}$—$T_{22}$ and, vice versa, that the receiver $R_2$ should receive no oscillations from the transmitter pair $T_{11}$—$T_{12}$, in which case undesirable beat frequencies are avoided in the receivers. This may be achieved by tuning corresponding transmitter pairs and receivers to a different carrier frequency. A separation may, however, also be achieved in other ways, as shown in Figures 8 and 9.

The ambiguity of the indication existing in the case of Figure 1 also exists in an arrangement according to Figure 7. This ambiguity may be avoided by introducing additional transmission times before the radiation of the frequency-modulated oscillations. Thus, the transmitters $T_{12}$, $T_{22}$ and $T_{32}$ in Figure 8a are each provided with a feeding line $d$ introducing a delay of the oscillations radiated by the transmitters compared with the oscillations radiated by the transmitter $T_{01}$. Accordingly, the equations (25a), (25b) and (25c) apply in determining the beat frequencies of the oscillations radiated by the individual transmitter pairs $T_{01}$—$T_{12}$, $T_{01}$—$T_{22}$, $T_{01}$—$T_{32}$, in the direction $a$, so that this direction may be determined at the receiver by rectification and frequency detection, is substantially the same manner as explained in connection with the equations (26a), (26c), (27a) and (27b).

In a transmitting arrangement according to Figure 8a and the cooperative receiver shown in Figure 8b, the separation of the oscillations from the various transmitters is achieved by synchronous switching. Switch $U_1$ operated by the motor $M_1$ in Figure 8a feeds the frequency-modulated oscillations of generator $G$ alternately and periodically to the transmitters $T_{12}$, $T_{22}$ and $T_{32}$ by way of the delay lines $d$, so that the beat frequencies $f_1$, $f_2$ and $f_3$ according to (25a), (25b) and (25c) for the individual transmitter pairs $T_{01}$—$T_{12}$, $T_{01}$—$T_{22}$, $T_{01}$—$T_{32}$ will occur alternately in the receiver $R$ of Figure 8b. The control voltages $e_{19}$, $e_{29}$ and $e_{39}$ corresponding to the beat frequencies are obtained by rectification in $D$ and frequency detection in circuit $H$, whereupon they are applied in succession to the field systems $F_1$, $F_2$ and $F_3$ of the rotary field indicator by means of the switch $U_2$ synchronized with the operation of switch $U_1$ at the transmitter. Thus, the control voltage $e_{19}$ corresponds to the beat frequency $f_1$ and is impressed upon the field system $F_1$, while the control voltage $e_{29}$ is impressed upon $F_2$ and control voltage $e_{39}$ is impressed upon $F_3$. In the example shown, these field systems are arranged to rotate in the constant field of a permanent magnet $P$ so as to adjust themselves in such a manner that the average resultant field formed by the three field coils coincides with the direction of the magnet field. In other words, the rotary system will rotate by an amount equal to the directional angle $a$ to be determined and indicated by the pointer $Z$. Due to its mechanical inertia, the rotary system and pointer cannot follow the field fluctuations caused by the periodic switching operation.

The switch $U_2$ at the receiver may be synchronized with the switch $U_1$ at the transmitter by means of special synchronizing impulses produced by an auxiliary generator $G_0$ and a further rotary switch $U_4$ driven synchronously with $U_1$. These synchronizing impulses are radiated by the auxiliary transmitter $T_0$ and received by a special receiver $R_0$. A synchronizing pulse voltage $u_6$ is obtained from the received synchronizing signals by means of an interrupter $U_5$, the average value of voltage $u_5$ depending on the phase deviation between $U_4$ and $U_5$, i. e. upon small phase deviations from the synchronous operation. A regulating voltage $u_6$ obtained by filtering and if necessary amplifying voltage $u_5$ in a filter $Y$, serves to control the speed in the motor $M_2$, in such a manner that the switches $U_1$ and $U_2$ are kept in synchronism both as to speed and correct phase position. Synchronization may of course also be achieved by any other means known in the art.

A special advantage of the arrangements shown in Figures 8a and 8b is the fact that only one generator and only one rectifier and one frequency detector are required at the transmitter and receiver, respectively. This results in a substantial saving of parts and considerably increased accuracy and is due to the fact that all changes due to the frequency variation limits or the fluctuation frequency $n$ of generator $G$ as well as all changes in the transmission properties of rectifier $D$ and frequency detector $H$ or other transmission elements, appear simultaneously and to the same effect as corresponding variations in the three field components of the rotary field indicator, whereby the direction of the resultant field vector and accordingly the directional indication $a$ remains unchanged.

As is understood, any number of equally angularly spaced transmitters according to Figure 8a or receivers according to Figure 6 cooperating with an indicator having a corresponding number of correspondingly oriented field producing members, may be used for the purpose of the invention.

Thus, in Figure 6, only two receivers $R_{12}$ and $R_{22}$ may be provided cooperating with receiver $R_{01}$ by means of a suitable distributor or switching device $U_1$ and with the connecting lines between $R_{01}$ and $R_{12}$ forming a right angle with the connecting line between $R_{01}$ and $R_{22}$ and the indicator also being provided with two orthogonal field producing members as shown in Figure 1 and alternately connected to the output of the common receiver by the synchronous switch $U_2$. In this manner, one of the receivers of Figure 1 may be dispensed with, while interference between the receivers is prevented on account of the successive operation in substantially the same manner as in the case of Figure 6. The same applies to the transmitting arrangement according to Figure 8a. In the latter, the transmitter $T_{32}$ cooperating with $T_{01}$ may be omitted and the resulting pairs of cooperating transmitters $T_{01}$, $T_{12}$ and $T_{01}$, $T_{22}$ oriented with their bases or connecting lines forming a right angle and with the distributors of Figure 8a and Figure 8b and the indicator correspondingly modified. In this case, only three transmitters and a single receiver will be required resulting in a substantial saving of equipment compared with the arrangement of Figure 7.

The discrimination between the various transmitter pairs in Figure 7 by means of different transmitting frequencies or by means of a synchronized switching in Figure 8 may be replaced by unequal frequency wobbling for the different transmitter pairs, such as by means of an arrangement shown in Figures 9a and 9b. In the latter, the high frequency generator $G_1$ feeding the first transmitter pair $T_{11}$—$T_{12}$ is controlled by the low frequency generator $G_4$, in such a manner that the frequency of the oscillations radiated by this transmitter pair varies periodically such as according to a sinusoidal wave. The oscillations of the generators $G_2$ and $G_3$ are controlled in a similar manner by separate low frequency control voltages $u_2$, $u_3$ produced by the low frequency generators $G_5$ and $G_6$, respectively, so that the following equations apply for the frequencies of the oscillations radiated by the transmitters $T_{12}$, $T_{22}$ and $T_{32}$:

$$f_{11} = f_0 + F_0 \sin(v_1 t) \quad (28a)$$
$$f_{21} = f_0 + F_0 \sin(v_2 t) \quad (28b)$$
$$f_{31} = f_0 + F_0 \sin(v_3 t) \quad (28c)$$

The feed lines $d$ cause a certain delay $t_0$, so that the following beat frequencies will occur simultaneously in the receiver Figure 9b, depending on the transmitting angle $a$:

$$f_1 = B_1 . \cos(v_1 t) . \left[ t_0 - \frac{b}{c} \cos(a) \right] \quad (29a)$$

$$f_2 = B_2 . \cos(v_2 t) . \left[ t_0 - \frac{b}{c} \cos(120° + a) \right] \quad (29b)$$

$$f_3 = B_3 . \cos(v_3 t) . \left[ t_0 - \frac{b}{c} \cos(240° + a) \right] \quad (29c)$$

By rectification in D, the low frequency voltage $e_6$ containing components of the frequencies $f_1$, $f_2$, $f_3$, is obtained. By means of the frequency detector circuit H there is then obtained voltage $e_7$ containing components proportional to $f_1$, $f_2$, $f_3$, these components varying periodically at the rate of double the low frequencies $v_1$, $v_2$ and $v_3$, respectively. These components $e_{1s}$, $e_{2s}$ and $e_{3s}$ are segregated by correspondingly tuned filter circuits $N_1$, $N_2$ and $N_3$ and rectified in $D_6$, $D_7$ and $D_8$, whereby to result in control voltages $e_{19}$, $e_{29}$ and $e_{39}$ which are proportional to the average beat frequencies $f_1$, $f_2$, $f_3$ and which, according to equations (25), (26) and (27) may be utilized for the direction indication. For the latter purpose, it is again possible to use an indicating instrument having fixed or rotatable and crossed coil elements. Alternatively, an electrostatic rotary field indicator may be used as shown in Figure 9b, wherein the rotary vane $F_0$ charged by a positive potential adjusts itself in the direction of the resultant electrostatic field of the electrostatic deflecting electrodes $F_1$—$F_1$, $F_2$—$F_2$ and $F_3$—$F_3$, respectively. An advantage of such arrangements is due to the fact that undesirable disturbing frequencies are, to a great extent, suppressed by the filters $N_1$, $N_2$, $N_3$.

The waves of variable frequency radiated and received for determining the direction in accordance with the invention, in general are in the form of electromagnetic or radio waves, i. e. their velocity of propagation $c$ is equal to the velocity of light. Other types of waves may, however, also be used, such as acoustic or sound waves within both the audible and inaudible range.

The invention may also be used for the operation of steering devices for controlling and maintaining the position or course of moving vehicles. In this case, means should be provided for actuating the control or steering mechanism of the vehicle by means of the rotary field indicator. These may consist in a known manner of contacts associated with the indicator adapted to control an electrical current for operating the steering elements of an airplane or other vehicle, whereby to counteract any deviation from and to automatically maintain a predetermined or set course of the vehicle.

While there have been described a few desirable embodiments of the invention, it is understood that this disclosure is for the purpose of illustration and that various changes in the circuits and arrangements shown, as well as the substitution of equivalent elements for those herein shown and described, may be made without departing from the spirit and scope of the invention, as defined in the appended claims. The specification and drawings are accordingly to be regarded in an illustrative rather than in a limiting sense.

I claim:

1. A direction finding system comprising a transmitting station, a receiving station, means for transmitting portions of radiant energy of periodically varying frequency from said transmitting station to said receiving station over at least three transmission paths whose lengths vary in proportion to the directional angle of a line connecting said stations, means at said receiving station for producing at least two control energies having amplitudes varying, respectively, in proportion to the instantaneous beat frequencies between the received energies transmitted over a first and a second pair of said paths, respectively, and ratio indicating means excited by said control energies for producing an indication proportional to the directional angle subtended by said line and a predetermined reference direction.

2. A direction finding system comprising a transmitting station, a receiving station, means for transmitting high frequency energy of periodically varying frequency from said transmitting station to said receiving station over at least three transmission paths the lengths of which vary in proportion to the directional angle of a line connecting said stations, means at said receiving station for producing at least two control energies having amplitudes varying, respectively, in proportion to the instantaneous beat frequencies between the respective energies transmitted over a first and second pair of said transmission paths, indicating means comprising a pair of field producing members relatively oriented at a predetermined angle with respect to each other, means for energizing each of said members by one of said control energies to produce a resultant field, and indication means directionally responsive to said resultant field.

3. A direction finding system comprising a transmitting station, a receiving station including at least three spaced receivers arranged so that the connecting lines of two pairs of receivers are oriented at predetermined angles with respect to each other, means for radiating high frequency energy of periodically varying frequency from said transmitting station to said receiving station, further means at said receiving station for producing control energies having amplitudes varying, respectively, in proportion to the instantaneous beat frequencies between the energies received by each of said pairs of receivers, and a ratio indicator excited by said control energies for producing an indication proportional to the directional angle of a line connecting said transmitting and receiving stations with respect to a predetermined reference direction.

4. A direction finding system comprising a transmitting station, a receiving station including at least three spaced receivers arranged whereby the connecting lines of two pairs of receivers are oriented at a right angle with respect to each other, means for radiating high frequency energy or periodically varying frequency from said transmitting station, further means at said receiving station for producing a pair of control energies having amplitudes varying, respectively, in proportion to the instantaneous beat frequencies between the energies received by each of said pairs of receivers, indicating means comprising a pair of field producing members relatively oriented at a right angle and each excited by one of said control energies, and a rotary flux carrying member cooperating with said first members whereby to align itself with the direction of the resultant field produced by said members.

5. A direction finding system comprising a transmitting station, a receiving station comprising a plurality of spaced receivers arranged so that the connecting lines between each two pairs of receivers are oriented at angles $2\pi/n$ with respect to each other, wherein $n$ is the number of pairs of receivers used, means for radiating high frequency energy of periodically varying frequency from said transmitting station, further means at said receiving station for producing a plurality of control energies having amplitudes varying, respectively, in proportion to the instantaneous beat frequencies between the energies received by each pair of receivers, indicating means having a plurality of field producing members equal in number to the number of pairs of said receivers and relatively oriented at angles $2\pi/n$, means for energizing each of said field producing members by the output energy derived from the respective pair of receivers, and a rotary flux carrying member cooperating with said field producing member, whereby to align itself with the direction of the resultant field produced by said members.

6. A direction finding system comprising means for radiating over a plurality of transmission paths portions of high frequency energy of periodically varying frequency from a first point to a second point, whereby the relative lengths of said transmission paths vary in proportion to the directional angle between a line connecting said points and a given reference direction, means at said second point for producing a plurality of control energies having amplitudes varying respectively, in proportion to the instantaneous beat frequencies between the respective received energy portions transmitted over different pairs of said transmission paths, and indicating means responsive to the vector resultant of said control energies for producing a direct indication of said directional angle.

7. A direction finding system comprising a transmitting station having at least three spaced transmitters arranged so that the connecting lines of two pairs of transmitters include a predetermined angle, a receiving station, means for simultaneously transmitting portions of high frequency energy of periodically varying frequency from said transmitting station to said receiving station, means at said receiving station for producing control energies having amplitudes varying respectively, in proportion to the instantaneous beat frequencies between the energies received from each of said pairs of transmitters, and a ratio indicator excited by said control energies for producing an indication proportional to the directional angle between a line connecting said transmitting and receiving stations and a predetermined reference direction.

8. A direction finding system comprising a transmitting station including a plurality of spaced transmitters arranged so that the connecting lines of at least two pairs of transmitters include a predetermined angle, a receiving station, means for simultaneously transmitting portions of high frequency energy of periodically varying frequency from said transmiters to said receiving station, means at said receiving station for producing control energies having amplitudes varying respectively, in proportion to the instantaneous beat frequencies between the energies received from each pair of transmitters, indicating means comprising at least two field producing members relatively oriented to include an angle equal to said predetermined angle and each being excited by one of said control energies, and a rotary flux carrying member cooperating with said field producing members whereby to align itself with the resultant field produced by said members.

9. A direction finding system comprising a transmitting station including a plurality of spaced transmitters arranged so that the connecting lines of a plurality of pairs of transmitters include an angle $2\pi/n$, $n$ representing the number of transmitter pairs, a receiving station, means for simultaneously transmitting portions of high frequency energy of periodically varying frequency from said transmitters to said receiving station, further means at said receiving station for producing a plurality of control energies having amplitudes varying respectively, in proportion to the instantaneous beat frequencies between the energies received from each pair of transmitters, a rotary field indicator comprising a plurality of field producing members relatively oriented at angles $2\pi/n$, means for energizing each of said members by one of said control energies, and a cooperating rotary member arranged to cooperate with said first members, whereby to align itself with the resultant field produced by said members.

10. A direction finding system comprising a transmitting station including at least three spaced transmitters arranged so that the connecting lines of two different pairs of said transmitters include a right angle, a receiving station, means for simultaneously radiating portions of high frequency energy of periodically varying frequency from said transmitters to said receiving station, further means at said receiving station for producing a pair of control currents having amplitudes varying respectively, in proportion to the instantaneous beat frequencies between the energies received by each of said pairs of transmitters, a rotary field indicator comprising a pair of magnetic windings relatively oriented at a right angle with respect to each other, means for energizing each of said windings by one of said control currents, and a premagnetized rotary member arranged to cooperate with said windings, whereby to align itself with the resultant magnetic field produced by said windings.

11. A direction finding system comprising a transmitting station, a receiving station including two pairs of spaced receivers arranged so that the connecting lines of corresponding pairs of receivers include a right angle, means for transmitting high frequency energy of periodically varying frequency from said transmitting station to said receiving station, further means at said receiving station for combining the energies received by each pair of receivers to produce control energies having amplitudes varying in proportion to the instantaneous beat frequencies of the respective energies received by each pair of receivers, a rotary field indicator comprising a pair of field producing members relatively oriented at a right angle with respect to each other, means for exciting each of said members by one of said control energies to produce a resultant field having a direction corresponding to the direction of a line connecting said transmitting and receiving stations, and indicating means directionally responsive to said resultant field.

12. A direction finding system comprising a transmitting station radiating high frequency energy of periodically varying frequency, a receiving station comprising a plurality of spaced receivers arranged so that the connecting lines between coordinated pairs of receivers are relatively oriented at predetermined angles with respect to each other, rectifying and frequency discriminating means for converting the beat frequencies between the energies received by each pair of receivers into control energies having amplitudes varying in proportion to the respective beat frequencies, first distributing means for successively and alternately connecting the different pairs of receivers to said rectifying and discriminating means, indicating means comprising a plurality of field producing members equal in number to the number of receiver pairs and oriented relatively at angles substantially corresponding to the orientation of the coordinated receiver pairs, second distributing means synchronously operated with said first distributing means for successively and alternately applying said output energies to said field producing members, and a rotary indicating member cooperating with said first members and having sufficient mechanical inertia, whereby to align itself with the resultant field produced by said first members.

13. A direction finding system comprising a transmitting station radiating high frequency energy of periodically varying frequency, a receiving station comprising a plurality of spaced receivers arranged so that the connecting lines between coordinated pairs of receivers are relatively oriented at predetermined angles with respect to each other, rectifying and frequency discriminating means for converting the beat frequencies between the energies received by each pair of receivers into control energies having amplitudes varying in proportion to the respective beat frequencies, first distributing means for successively and alternately connecting the different pairs of receivers to said rectifying and discriminating means, indicating means comprising a plurality of magnetic windings equal in number to the number of receiver pairs and oriented relatively at angles substantially corresponding to the orientation of the coordinated receiver pairs, second distributing means synchronously operated with said first distributing means for successively and periodically applying said output energies to said windings, a magnetic member for producing a substantially constant magnetic field, said magnetic windings and said member being relatively rotatable, whereby to produce an indication of the direction of the line connecting said transmitting station and said receiving station in respect to a predetermined reference direction.

14. A direction finding system comprising a transmitting station radiating high frequency energy of periodically varying frequency, a receiving station comprising a plurality of spaced receivers arranged so that the connecting lines between coordinated pairs of receivers are relatively oriented at predetermined angles with respect to each other, rectifying and frequency discriminating means for converting the beat frequencies between the energies received by each pair of receivers into control energies having amplitudes varying in proportion to the respective beat frequencies, first distributing means for successively and alternately connecting the different pairs of receivers to said rectifying and discriminating means, indicating means comprising a plurality of relatively fixed and coaxial magnet windings equal in number to the number of receiver pairs and being oriented relatively at angles corresponding substantially to the orientation of the coordinated receiver pairs, second distributing means synchronously operated with said first distributing means for successively and periodically applying said output energies to said magnet windings, and a rotary magnetic member producing a substantially constant magnetic field and arranged to cooperate with said windings, said member having a sufficient mechanical inertia, whereby to align itself with the resultant magnetic field produced by said windings.

15. A direction finding system comprising a transmitting station radiating high frequency energy of periodically varying frequency, a receiving station comprising a plurality of spaced receivers arranged so that the connecting lines of coordinated pairs of receivers are relatively oriented at successive angles $2\pi/n$, $n$ representing the number of receiver pairs, rectifying and frequency discriminating means for converting the beat frequencies between the energies received by each pair of receivers into control energies having amplitudes varying in proportion to the respective beat frequencies, first distributing means for successively and periodically connecting the different pairs of receivers to said rectifying and discriminating means, indicating means comprising a plurality of field producing members equal in number to the number of receiver pairs and oriented at successive angles $2\pi/n$, second distributing means synchronously operated with said first distributing means for successively and periodically applying said output energies to said members, and a rotary member producing a substantially constant field and cooperating with said first members, whereby to align itself with the resultant field produced by said first members.

16. In a direction finding system, a transmitting station comprising a plurality of spaced transmitters arranged so that the connecting lines of coordinated pairs of transmitters are relatively oriented at successive angles $2\pi/n$ with respect to each other, wherein $n$ represents the number of transmitter pairs, a generator for producing high frequency energy of periodically varying frequency, first distributing means for successively and periodically connecting said generator to the successive pairs of transmitters, a receiving station comprising means for producing control energy of amplitude varying in proportion to the beat frequencies between the energies received from corresponding transmitter pairs, indicating means comprising a plurality of field producing members also oriented at successive angles of $2\pi/n$, second distributing means for successively and periodically applying said control energies to said members, a further member producing a substantially constant field and being relatively rotatable with respect to said first members, and means for synchronously operating said first and said second distributing means.

17. In a direction finding system, a transmitting station comprising a plurality of spaced transmitters arranged so that the connecting lines of coordinated pairs of transmitters are relatively oriented at successive angles $2\pi/n$ with respect to each other, wherein $n$ represents the number of transmitter pairs, a generator for producing high frequency energy of periodically varying frequency, first distributing means for successively and periodically connecting said generator to the successive pairs of transmitters, a receiving station comprising means for producing control energy of amplitude varying in proportion to the beat frequencies between the energies received from corresponding transmitter pairs, indicating means comprising a plurality of magnetic field windings also oriented at successive angles of $2\pi/n$, second distributing means for successively and periodically applying said control energies to said windings, a further magnetic member producing a substantially constant magnetic field and in relatively rotating relation with respect to said first members, and means for synchronously operating said first and said second distributing means.

18. In a direction finding system, a transmitting station comprising a plurality of spaced transmitters arranged so that the connecting lines of coordinated pairs of transmitters are relatively oriented at successive angles $2\pi/n$ with respect to each other, wherein $n$ represents the number of transmitter pairs, a generator for producing high frequency energy of periodically varying frequency, first distributing means for successively and periodically connecting said generator to the successive pairs of transmitters, a receiving station comprising means for producing control energy of amplitude varying in proportion to the beat frequencies between the energies received from corresponding transmitter pairs, indicating means comprising a plurality of fixed coaxial magnet windings relatively oriented at successive angles of $2\pi/n$, second distributing means for successively and periodically applying said control energies to said windings, a further magnetic member producing a substantially constant magnetic field and rotatably arranged within said magnet windings, and means for synchronously operating said first and said second distributing means.

19. In a direction finding system, a transmitting station comprising a plurality of spaced transmitters arranged so that the connecting lines of coordinated pairs of transmitters are relatively oriented at successive angles $2\pi/n$ with respect to each other, wherein $n$ represents the number of transmitter pairs, a generator for producing high frequency energy of periodically varying frequency, first distributing means for successively and periodically connecting said generator to the successive pairs of transmitters, a receiving station comprising means for producing control energy of amplitude varying in proportion to the beat frequencies between the energies received from corresponding transmitter pairs, indicating means comprising a plurality of field producing members also oriented at successive angles of $2\pi/n$, second distributing means for successively and periodically applying said control energies to said members, a further member producing a substantially constant field and being relatively rotatable with respect to said first members, and means for synchronously operating said first and said second distributing means, said last means comprising additional transmitting and receiving means for producing and transmitting synchronizing signals derived from said first distributing means, and means for utilizing the received synchronizing signals for controlling and maintaining the synchronism of said second distributing means.

GUSTAV GUANELLA.

REFERENCES CITED

The following references are of record in the file of this patent:

UNITED STATES PATENTS

| Number | Name | Date |
|---|---|---|
| 2,413,620 | Guanella | Dec. 31, 1946 |